Figure 1:
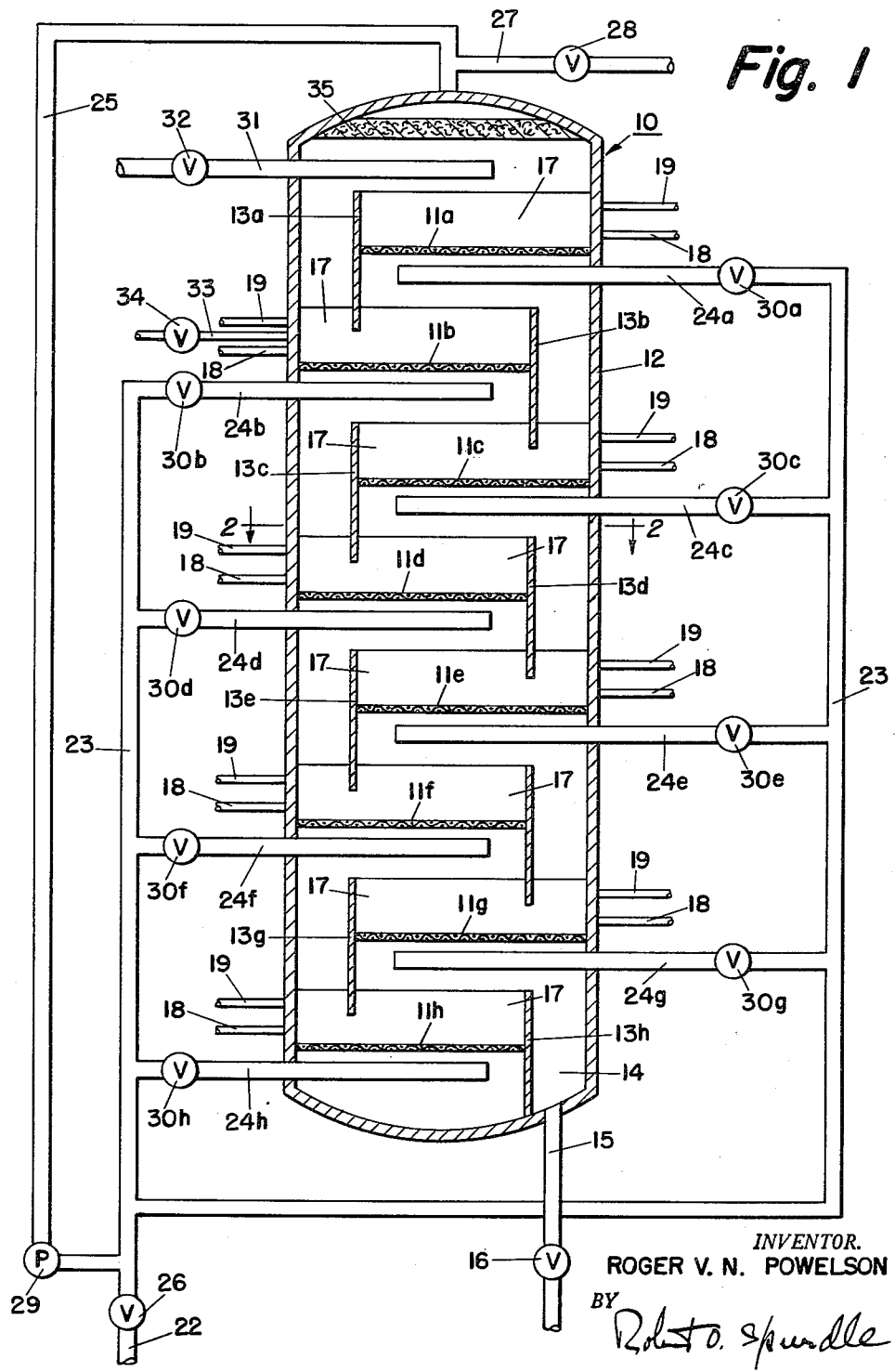

INVENTOR.
ROGER V. N. POWELSON

Aug. 14, 1962 R. VAN NEST POWELSON 3,049,527
PROCESS AND APPARATUS FOR THE CONTINUOUS
REACTION OF GASEOUS REACTANTS
Filed Dec. 8, 1959 2 Sheets-Sheet 2

INVENTOR.
ROGER V. N. POWELSON
BY
ATTORNEY

United States Patent Office 3,049,527
Patented Aug. 14, 1962

3,049,527
PROCESS AND APPARATUS FOR THE CONTINUOUS REACTION OF GASEOUS REACTANTS
Roger Van Nest Powelson, Ambler, Pa., assignor to Sun Oil Company, Philadelphia, Pa., a corporation of New Jersey
Filed Dec. 8, 1959, Ser. No. 858,214
5 Claims. (Cl. 260—93.7)

This invention relates to a process for conducting continuous chemical reactions, and more particularly to a process for conducting chemical reactions wherein a gas is caused to react in a liquid reaction medium, which may be inert under the reaction conditions, or which may be reactive with the gas.

There are a number of processes in which a gas is caused to react in a liquid reaction medium in order to form reaction products. Among these processes may be mentioned the oxidation of paraffin wax to form acids, alcohols, and carbonyl compounds; oxidation of 2,6-dimethyl naphthalene to form 2,6-naphthalene dicarboxylic acid; oxidation of para-xylene to form terephthalic acid; and polymerization of normally gaseous straight chain alpha-olefins in the presence of a coordination complex polymerization catalyst. Other reactions of this type will suggest themselves to those skilled in the art. Since the process of the invention is particularly useful in polymerizations, the following description will be concerned with such reactions, it being understood, however, that the process of the invention is not limited to these reactions, but is applicable to any reaction in which a gas is caused to react in a liquid medium.

Processes for the polymerization of normally gaseous alpha-olefins such as ethylene, propylene and butene-1, and mixtures thereof, to solid polymers with the aid of a solid coordination complex catalyst are known. The catalyst system believed to be most effective for the polymerization is titanium chloride activated with an aluminum alkyl or aluminum alkyl halide, although other activators such as other metal alkyls and hydrides may be used. Other metal halides such as vanadium, zirconium, or iron chloride may be substituted for the titanium chloride. Since the present invention does not rely for patentability on the use of any particular catalyst, there would appear to be no necessity to list all the specific catalyst systems which may be used in the practice of the invention.

All of the coordination complex catalysts are reactive with oxygen and polar compounds, and must be decomposed in the processing of the polymer after the polymerization reaction has been completed. Consequently, in order to obtain the maximum amount of polymer from a given amount of catalyst, it has been the practice to conduct the reaction in an autoclave fitted with an agitator as a batch process, continuing the reaction until the catalyst particles have become so coated with polymer that they are no longer effective to catalyze the reaction at a reasonable rate. The polymerization reaction is quite exothermic, and the stirred autoclave has the disadvantage that heat removal from the reactor contents is non-uniform, since even with good agitator design there will always be zones of relative quiescence which will be at a higher temperature than the zones of turbulence in contact with the heat removal means. When ethylene or butene-1 is being polymerized, zones of higher or lower temperature can be lived with, even though the range of molecular weight in the product will be higher than would be the case if it were possible to keep the reactor contents at a uniform temperature throughout. In the case of propylene polymerization, however, non-uniform temperatures have a very serious effect on the reaction. If the temperature at any point in the reactor is allowed to rise above about 90° C., the polymer forms in strings which wrap themselves about the impeller and destroy its efficiency, giving rise to the formation of still more stringy polymer. When this happens the reaction must be discontinued, and the polymer must be removed manually from the impeller, which is a very difficult task. Another disadvantage of the batch process is its discontinuity, necessitating the provision of storage facilities for each batch of product as it is dumped from the reactor. Also, the molecular weight and melt index of the polymer will vary to some degree from batch to batch.

Proposals have heretofore been made for polymerizing olefins in a continuous manner in the presence of a coordination complex catalyst, which involve the continuous addition of catalyst and continuous withdrawal of product from a reactor of the stirred autoclave type. If but one reaction vessel is used in this type of operation, incomplete utilization of catalyst is had, since the catalyst in the vessel will be in equilibrium insofar as activity is concerned, and some comparatively fresh catalyst will be continuously withdrawn from the reactor along with the product. This effect may be minimized by passing the reaction mixture through a series of reactors, but the disadvantage of inadequate heat control in a stirred autoclave-type reactor will remain.

It is an object of this invention to provide a continuous process for conducting chemical reactions in the presence of a liquid reaction medium while maintaining the temperature at a substantially constant value throughout the reaction mixture.

Other objects and advantages of the invention will become apparent as the disclosure proceeds.

In general, in the embodiment hereinafter discussed, my invention consists in causing a suspension of catalyst in liquid reaction medium to flow over a series of foraminous members, placed one above the other in a reaction vessel while passing the monomer to be polymerized upwardly through the foraminous member at a velocity sufficient to hold the liquid on the member. Each member, which is preferably fabricated of stainless steel mesh of a sieve size small enough to create an appreciable pressure drop through the member, is provided with an upwardly extending weir to hold a pool of liquid on the member, and a downcomer extending below the liquid level on the next lower member to inhibit the flow of monomer through the weir opening. Cooling means, which extend in the direction of liquid flow, are provided above each member in order to remove the heat of reaction, and means are provided for introducing additional monomer below each member to make up for that consumed in the reaction on the next lower member and to maintain the upward velocity of the monomer at the desired rate. The gaseous monomer flowing upwardly through liquid reaction mixture keeps the entire reaction mixture in a state of violent turbulence, with no relatively quiescent zones, so that the temperature may be maintained substantially constant through the mixture. Since there is a pressure drop across the foraminous members, the pressure at the bottom of the reactor will be greater than at the top. This higher pressure will cause a higher percentage of monomer to be dissolved in the reaction medium on the lower members, where the catalyst is partially deactivated, and will speed up the reaction rate, causing the reaction rate throughout the reactor to be substanially uniform.

In order that those skilled in the art may more fully understood my invention and the manner of carrying it out it will be more particularly described as a process for the polymerization of propylene in connection with the accompanying drawings in which FIG. 1 is a vertical cross-sectional view of a reactor adapted to practice the process of the invention.

Figure 2:
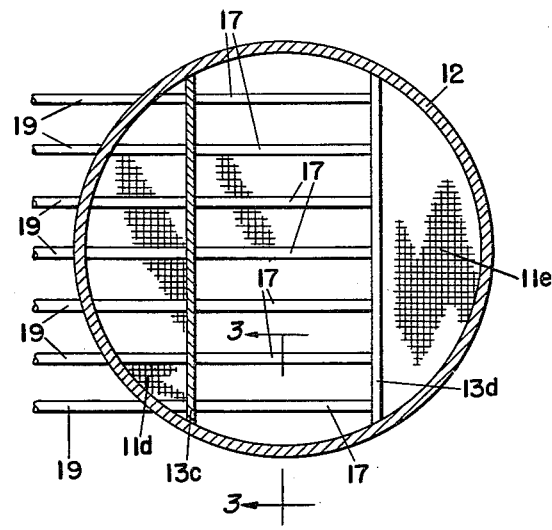
Figure 3:
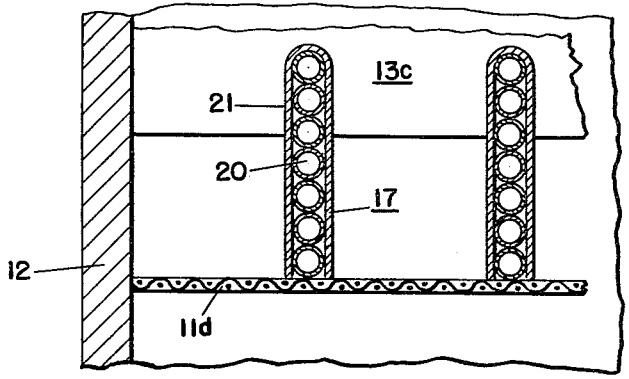

FIG. 2 is a horizontal cross-sectional view taken across the line 2—2 of FIG. 1, and FIG. 3 is a fragmentary vertical cross-sectional view taken across lines 3—3 of FIG. 2.

Referring now to FIG. 1, the reactor, indicated generally at 10, is provided with a number of foraminous members 11a, 11b, 11c, 11d, 11e, 11f, 11g and 11h, which extend across an area defined by the interior wall of reactor shell 12 and weir plates 13a, b, c, d, e, f, g and h. The foraminous members are preferably formed of stainless steel wire mesh, but may also be perforated steel plates. The weir plates extend downwardly from each foraminous member to a level below the upper level of the weir plate attached to the next lower foraminous member, and extend across the diameter of the reactor, as illustrated in FIG. 2. The lowermost weir plate, 13h, extends to the bottom of reactor 10 to form a receiving basin 14, from which the polymerizate may be withdrawn for further processing via line 15 under the control of valve 16.

Heat exchange members 17 extend across foraminous members 11 in the direction of liquid flow, and inlet lines 18 and outlet lines 19 are provided for furnishing cooling fluid to and withdrawing it from heat exchange members 17. As illustrated in FIG. 3, cooling members 17 consist of a pipe coil 20 encased in a smooth-sided casing 21 in order to avoid pockets in which liquid could stagnate.

In starting up the process the reactor 10, manifold 23, inlet lines 24a, b, c, d, e and h, and recirculation line 25 are flushed with propylene introduced through line 22 under control of valve 26 until all air has been removed, flush gases being removed through vent line 27 under the control of valve 28. When all air has been flushed from the system, valve 28 is closed, the reactor 10 is pressurized to 140 p.s.i.g., and circulation of propylene through the reactor, recirculation line 25, and inlet line 24h is commenced under the influence of pump 29 in line 25. The rate of circulation is sufficient to maintain a body of liquid, to be subsequently introduced, on the foraminous members 11a, b, c, d, e, f, g and h. The rate will, of course, vary with the size of the openings in the foraminous members, but the proper rate, for a particular size mesh, may be easily calculated by one skilled in the art. At this time valves 30a, b, c, d, e, f and g are closed, only valve 30h being open.

When circulation has been established, an inert liquid reaction medium, such as heptane or isooctane is introduced at a temperature of 140° F. to the top of the reactor through line 31 under the control of valve 32. Since at this time there is nothing to prevent the free flow of gas through the spaces between the weir plates 13 and the reactor wall, the velocity of the gas through the foraminous members 11 will be insufficient to hold the liquid thereon, and the liquid will fall through the reactor, collecting on foraminous member 11h. Since weir plate 13h extends to the bottom of the reactor 10, all gas from line 24h must pass through member 11h, and the velocity will be sufficient to hold the liquid on this member.

After the liquid on member 11h has built up to a height above that of the lower edge of weir plate 13g, flow of gas through the passage between plate 13g and the wall of the reactor will be blocked, and gas will be forced through member 11g at a rate sufficient to hold liquid upon it. This process will continue until the space above each member 11 is filled with liquid to the level of the upper edge of each associated weir plate. At this time catalyst is introduced through line 33 under the control of valve 34, while continuing flow of reaction medium through line 31. At this time liquid will begin to overflow over weir 13a into the liquid on member 11b, and the overflow will continue over each successive weir 13 until liquid begins to overflow over weir 13h into receiving basin 14. At this time withdrawal of liquid from basin 14 through line 15 under control of valve 16 is begun, in order to hold a constant liquid level in basin 14. The catalyst is preferably a complex of titanium trichloride and aluminum triethyl in a mole ratio of 1:2, or titanium trichloride, aluminum ethyl dichloride and aluminum triethyl in a mole ratio of 1:2:2. Alternatively, an equimolar ratio of titanium trichloride and aluminum diethyl chloride may be used. The flow of reaction medium and that of the catalyst should be so correlated that from about 0.005 to about 0.01 pound of titanium trichloride are introduced to the reactor per gallon of reaction mixture, and the flow of reaction mixture is so regulated as to allow the desired residence time in the reactor, for example four hours. The catalyst is introduced into the liquid above member 11b instead of into the liquid above member 11a in order to eliminate carry-over of entrained catalyst into demister 35.

As soon as the flow of catalyst is started polymerization starts in the liquid above member 11b. In order to make up for propylene consumed in the reaction, valve 30a is opened, and propylene in an amount equal to that consumed over member 11a is admitted through line 22, manifold 23, and line 24a in order to maintain the rate of flow of propylene through member 11a at a constant value to hold the liquid thereupon. As the catalyst makes its way downward by overflow over weirs 13 to the next lower member 11 whereby to commence polymerization thereon, valves 30b, 30c, 30d, 30e, 30f and 30g are successively opened to introduce to the reactor above each liquid pool a quantity of propylene equal to that consumed in the liquid pool immediately below the point of introduction of the propylene. By so proceeding a uniform upward flow of propylene is maintained throughout the tower. After the catalyst has migrated down through the reactor to the liquid pool above member 11h, a slurry of polymer in reaction medium will overflow weir plate 13h into basin 14. This slurry is withdrawn through line 15 for further processing to deactivate the catalyst and to recover the polymer from the liquid medium.

During the polymerization cooling means 17 are operated to maintain a reaction temperature of 160° F. By virtue of the violent and uniform agitation imparted by the upflowing propylene to the reaction mixture above each member 11, uniform temperature conditions may be maintained throughout the reaction mixture, leading to a more homogenous product than can be obtained by carrying out the reaction in a stirred autoclave.

The invention claimed is:

1. A process for conducting chemical reactions which comprises continuously passing a liquid downwardly over a series of foraminous members arranged one above the other while passing a reactive gas upwardly through the liquid at a rate sufficiently high to prevent the liquid from flowing through the foraminous member, exothermically reacting the gas while in contact with said liquid to form a non-gaseous reaction product, adding further reactive gas below each foraminous member in an amount sufficient to replace the gas reacted on the next lower foraminous member, removing heat resulting from the reaction from the liquid above each plate, and recovering a reaction product from the liquid above the lowest foraminous member.

2. A process for the polymerization of olefins which comprises continuously passing an inert hydrocarbon reaction medium containing particles of a solid coordination complex catalyst downward over a series of foraminous members arranged one above the other while passing a monomer selected from the group consisting of ethylene, propylene, and butene-1 upwardly in vapor phase through the reaction medium at a rate sufficiently high to prevent the liquid medium from flowing through the foraminous member, maintaining the reaction medium at a temperature favoring polymerization, polymerizing the monomer in the reaction medium, adding further monomer to the upflowing gas stream at a point below each foraminous member in an amount sufficient to replace the monomer consumed in the polymerization reaction on the next lower foraminous member, and recovering a slurry of solid polymer in the reaction medium from the lowest foraminous member.

3. The process according to claim 2 in which the monomer is ethylene.

4. The process according to claim 2 in which the monomer is propylene.

5. The process according to claim 2 in which the monomer is butene-1.

References Cited in the file of this patent

UNITED STATES PATENTS

| | | |
|---|---|---|
| 2,337,419 | Sensel | Dec. 21, 1943 |
| 2,512,562 | Cummings | June 20, 1950 |
| 2,707,163 | Thibaut | Apr. 26, 1955 |
| 2,716,587 | Hillard | Aug. 30, 1955 |
| 2,825,721 | Hogan et al. | Mar. 4, 1958 |
| 2,885,389 | Schappert | May 5, 1959 |
| 2,936,303 | Goins | May 10, 1960 |